2,998,458
Patented Aug. 29, 1961

2,998,458
PROCESS FOR PREPARING PENTAERYTHRITOL
Herman A. Bruson, North Haven, Conn., and John J. Hewitt, Wilmington, Del., assignors to Olin Mathieson Chemical Corporation, New Haven, Conn., a corporation of Virginia
No Drawing. Filed June 27, 1958, Ser. No. 744,909
6 Claims. (Cl. 260—635)

This invention relates to an improved process for the preparation of pentaerythritol and more particularly to a process whereby pentaerythritol of improved quality can readily be prepared.

Pentaerythritol is generally produced by the reaction of formeldehyde with acetaldehyde in an alkaline aqueous solution. Despite precautions, undesired side reactions resulting in decreased yields and the presence of colored contaminants in the product have been unavoidable. One source of such difficulties has, for example, been the presence of heavy metal ions, particularly iron, in the reaction mixture. However, expedients such as the use of distilled or de-ionized water have been inadequate, as among other factors, no provision is made against contamination of the reaction mixture and the resulting product effected through contact with metal process equipment or transfer lines.

The main object of this invention has been the provision of a process for the manufacture of pentaerythritol which results in a product of high purity. Another object has been the provision of a process whereby a white product may be obtained even in the presence of heavy metal ions in the reaction mixture. Further objects include the provision of means to suppress the formation of colored contaminants during the preparation of pentaerythritol and to enable the production of a pure product at lower cost.

The above and other objects have been accomplished by the addition of an organic chelating agent to the reaction mixture which has been found to enable the production of a product of increased purity and improved color characteristics.

In accordance with this invention, an organic chelating agent effective in alkaline solutions to combine with any heavy metal ions present, so as to retain them within a comparatively stable ring structure, is incorporated in the aqueous reaction mixture.

Examples of suitable chelating agents are hydroxycarboxylic acids and aminocarboxylic acids and alkali salts thereof, such as, ethylenediamine tetraacetic acid, tartaric acid and alkali tartrates, citric acid and alkali citrates, ammonium triacetic acid, N,N-di(2 hydroxyethyl) glycine, salicylic acid, sulfosalicylic and saccharic acid and alkali salts of these acids. Of these, ethylenediamine tetraacetic acid and the alkali salts thereof and glucono-delta-lactone, gluconic acid or alkali salts of gluconic acid such as sodium gluconate, have been found to be the most advantageous for improvement in the process of the present invention. The amount of organic chelating agent which is employed will depend upon the metal ion concentration in the reaction medium. In general, it has been found that concentrations from 0.05 gram to 1 gram per liter of reaction mixture are effective for the achievement of the desired results. Concentrations below the lower limit may not be consistently effective; amounts higher than about 1 gram per liter add to the expense and do not appreciably increase the effectiveness except in the presence of abnormally high amounts of metal ions.

The following specific examples are illustrative of the present invention.

*Example 1*

44 grams of acetaldehyde were added to a stirred suspension of 416 grams of 36% formalin and 48 grams of calcium hydroxide in 360 cc. of tap water containing 0.4 gram of disodium ethylene diamine tetraacetate, and the mixture was maintained at a temperature of 15° C. to 25° C. for an hour. The reaction mixture was then maintained for 1.5 hours at 40° C. with continued agitation, and was then cooled and neutralized with formic acid. The solution was then concentrated by boiling off the water to a volume of about 400 ml., the solution turning pale yellow.

On cooling, a white crystalline product, melting to a colorless liquid, at 181° to 191° C. was obtained. Additional white crystalline product was obtained by concentrating and cooling the filtrate. The total product amounted to 104 grams (75% of theoretical yield) of white pentaerythritol of excellent purity.

When the above process was repeated with the exception that the chelating agent was omitted, the solution darkened during the process of boiling to remove water. The solution turned dark yellow at a volume of 600 ml., and had blackened at a volume of 400 ml., yielding highly colored pentaerythritol on cooling, which could be purified only with high losses in yield during the steps required for the removal of impurities.

*Example 2*

360 cc. of water which had been deionized by treatment with an ion exchange resin and containing 0.05 gram of glucono-delta-lactone were mixed with 416 grams of 37% formalin. The solution was chilled to 10° C. and one-third of a solution of 44 grams of NaOH in 200 cc. of water was added. 44 grams of acetaldehyde diluted with an equal volume of deionized water were added over a period of 20 minutes, while maintaining the temperature at 10° to 15° C. After one-third the acetaldehyde had been added, half of the remaining caustic solution was mixed in, and then the remainder was added on the addition of two-thirds of the acetaldehyde. After completion of the addition, stirring was continued for a period if 40 minutes at 10°–15° C., following which the solution was warmed in an hour to 75° C. and then cooled in an hour to about 50° C. The solution was then cooled, neutralized with carbon dioxide and finally with formic acid and was concentrated by boiling off the water to a volume of 350 ml. Upon cooling, pure white crystalline pentaerythritol was recovered which melted to a colorless liquid at 225° to 235° C. Two repetitions of the crystallization procedure resulted in a total of 110 grams (80% of theoretical yield) consisting of white pentaerythritol of excellent quality.

The above process was repeated except that the chelating agent was omitted. The reaction solution was highly colored after it had been concentrated by boiling. On cooling the solution, a tan-color crystalline product was first obtained and a more deeply colored second crop after further concentration and cooling of the filtrate. Recrystallization of the first crop yielded a product displaying a yellow tinge which melted to give a brown-colored liquid.

*Example 3*

The procedure of the above example was repeated except that the formalin solution contained 0.20 gram of salicylic acid as chelating agent. The product consisted of white crystalline pentaerythritol obtained at 81% of the theoretical yield, melting at 190°–200° C. to a clear liquid having a slight straw tinge.

Similarly, comparative experiments have demonstrated the advantageous improvement in the production of pentaerythritol of high purity effected by the use of organic chelating agents in accordance with this invention. The preferred agents are the hydroxycarboxylic acids and the aminocarboxylic acids, particularly, the aminopolycarboxylic acids, it being understood that these acids may be present in the reaction mixture in the form of the sodium or other alkali-metal salt. Preferably, the chelating agent is added to the aqueous solution of formaldehyde, but may also be distributed among the aqueous solutions taking part in the reaction. Likewise, this invention enables the production of white crystalline pentaerythritol of high quality using a batch or continuous process, various catalysts for the reaction, and employing any of a variety of reaction procedures.

We claim:

1. Process for preparing pentaerythritol comprising reacting formaldehyde and acetaldehyde in an alkaline aqueous solution containing an inorganic base and 0.05 to 1 gram per liter of an organic carboxylic chelating agent chosen from the group consisting of ethylenediamine tetraacetic acid, tartaric acid, citric acid, ammonium triacetic acid, N,N-di(2 hydroxyethyl) glycine, salicylic acid, sulfosalicylic acid, saccharic acid, glucono-delta-lactone, gluconic acid, and alkali salts of the said acids, forming substantially colorless pentaerythritol crystals, and separating said crystals from the said solution.

2. Process in accordance with claim 1, wherein the reaction is initially at below room temperature and is completed at above room temperature.

3. Process in accordance with claim 1, wherein the reaction mixture is concentrated by evaporating water therefrom prior to the separation of the said crystals.

4. Process for preparing pentaerythritol comprising reacting formaldehyde and acetaldehyde in an alkaline aqueous solution containing an inorganic base and 0.05 to 1 gram per liter of the disodium salt of ethylenediaminetetraacetic acid, forming substantially colorless pentaerythritol crystals, and separating said crystals from the said solution.

5. Process for preparing pentaerythritol comprising reacting formaldehyde and acetaldehyde in an alkaline aqueous solution containing an inorganic base and 0.05 to 1 gram per liter of glucono-delta-lactone, forming substantially colorless pentaerythritol crystals, and separating said crystals from the said solution.

6. Process for preparing pentaerythritol comprising reacting formaldehyde and acetaldehyde in an alkaline aqueous solution containing an inorganic base and 0.05 to 1 gram per liter of salicylic acid, forming substantially colorless pentaerythritol crystals, and separating said crystals from the said solution.

References Cited in the file of this patent

UNITED STATES PATENTS

| | | |
|---|---|---|
| 2,401,749 | Burghardt et. al. | June 11, 1946 |

FOREIGN PATENTS

| | | |
|---|---|---|
| 742,159 | Great Britain | Dec. 21, 1955 |

OTHER REFERENCES

Martell et al.: Chemistry of the Metal Chelate Compounds, pages 471, 493–5, 510–11 (1952).

Smith: Chemistry and Industry, November 10, 1956, pages 1284–91 (pages 1287–8 relied upon).